United States Patent
Dagh et al.

[11] Patent Number: 5,988,613
[45] Date of Patent: Nov. 23, 1999

[54] WHEEL HUB AND BRAKE DISC ARRANGEMENT FOR A VEHICLE WHEEL

[75] Inventors: Ingemar Dagh, Gothenburg; Mats Fagergren, Kungälv, both of Sweden

[73] Assignee: Volvo Lastvagnar AB, Gothenburg, Sweden

[21] Appl. No.: 09/202,527

[22] PCT Filed: Jun. 16, 1997

[86] PCT No.: PCT/SE97/01053

§ 371 Date: Jan. 5, 1999

§ 102(e) Date: Jan. 5, 1999

[87] PCT Pub. No.: WO97/48919

PCT Pub. Date: Dec. 24, 1997

[30] Foreign Application Priority Data

Jun. 17, 1996 [SE] Sweden .................................. 9602385

[51] Int. Cl.⁶ ................................................ F16F 1/34
[52] U.S. Cl. ................. 267/161; 188/18 A; 192/89.22; 411/536; 411/544
[58] Field of Search .................................. 188/17, 18 A, 188/18 R, 264 A, 264 AA, 264 G; 267/160, 161; 192/89.22–89.25; 411/155, 156, 535, 536

[56] References Cited

U.S. PATENT DOCUMENTS

| | | | |
|---|---|---|---|
| 3,631,910 | 1/1972 | Hurst et al. | 411/155 |
| 3,856,066 | 12/1974 | Reynolds | 411/155 |
| 4,300,669 | 11/1981 | Browne | 267/161 |
| 4,601,376 | 7/1986 | Reik | 192/89.22 |
| 4,667,793 | 5/1987 | Kunz et al. | 192/70.12 |
| 4,747,586 | 5/1988 | Reik | 267/161 |
| 5,013,199 | 5/1991 | Downes | 401/544 |
| 5,174,420 | 12/1992 | DeWald et al. | 188/264 E |
| 5,507,367 | 4/1996 | Dagh et al. | 188/18 A |
| 5,540,303 | 7/1996 | Bodin et al. | 188/18 A |
| 5,568,846 | 10/1996 | Dagh et al. | 188/218 XL |

FOREIGN PATENT DOCUMENTS

| | | |
|---|---|---|
| 1562753 | 12/1965 | France . |
| 469687 | 8/1993 | Sweden . |
| 469688 | 8/1993 | Sweden . |
| 501006 | 10/1994 | Sweden . |

*Primary Examiner*—Chris Schwartz
*Attorney, Agent, or Firm*—Young & Thompson

[57] ABSTRACT

This invention relates to a wheel hub and brake disc arrangement for a vehicle wheel comprising a hub mounted via a bearing on a stub axle, a brake disc non-rotatably mounted on a carrier portion of the hub and a lock ring axially fixed at an end of the carrier portion. The lock ring has a first side surface lying in contact with a surface on the brake disc and a second side surface located radially inwardly of the first side surface, the second side surface being in contact with a surface of the hub. The lock ring also has areas located radially between the first and second side surfaces which lack contact both with the surfaces on the brake disc and the brake hub. The lock ring is also provided with circumferentially spaced bosses. The lock ring permits limited axial displacement of the brake disc, relative to the carrier portion of the hub, upon axial loading of the brake disc.

9 Claims, 2 Drawing Sheets

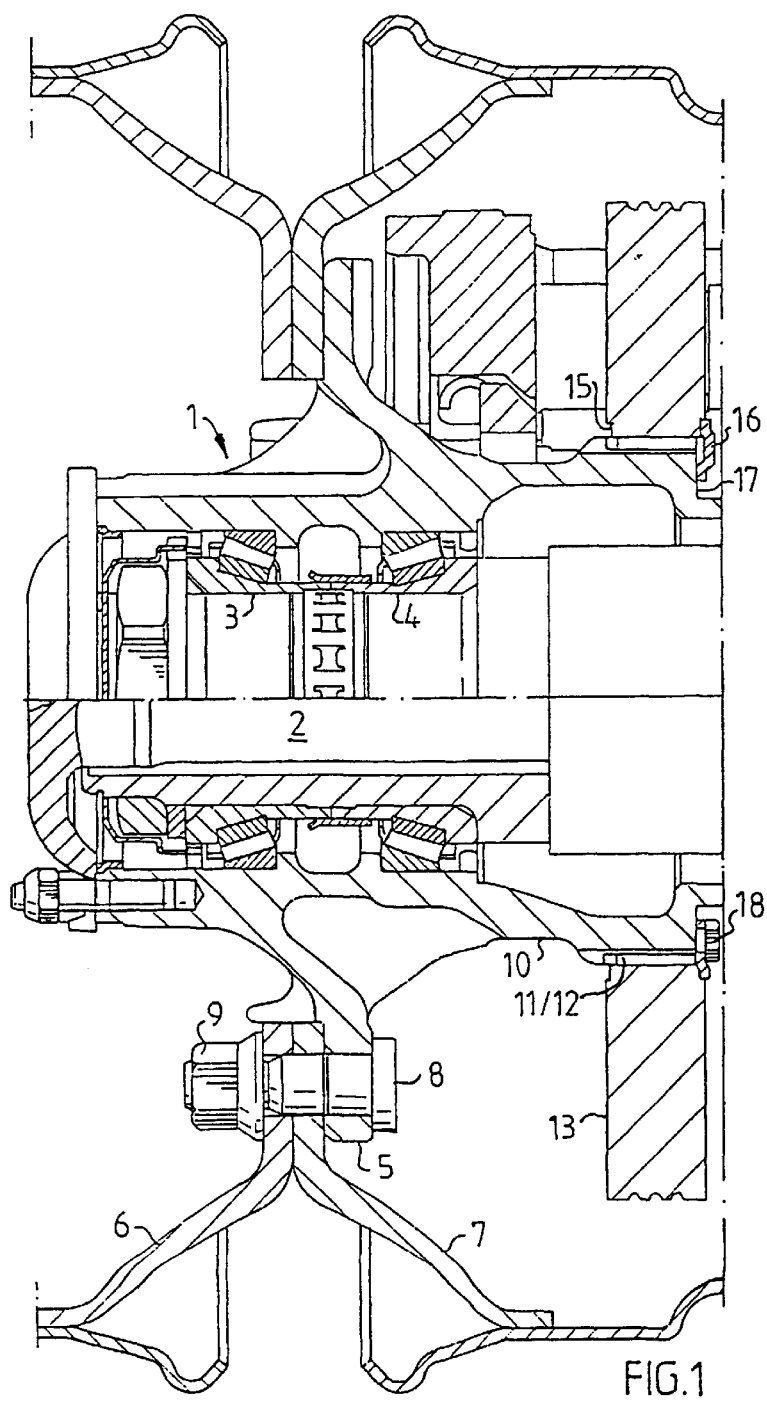
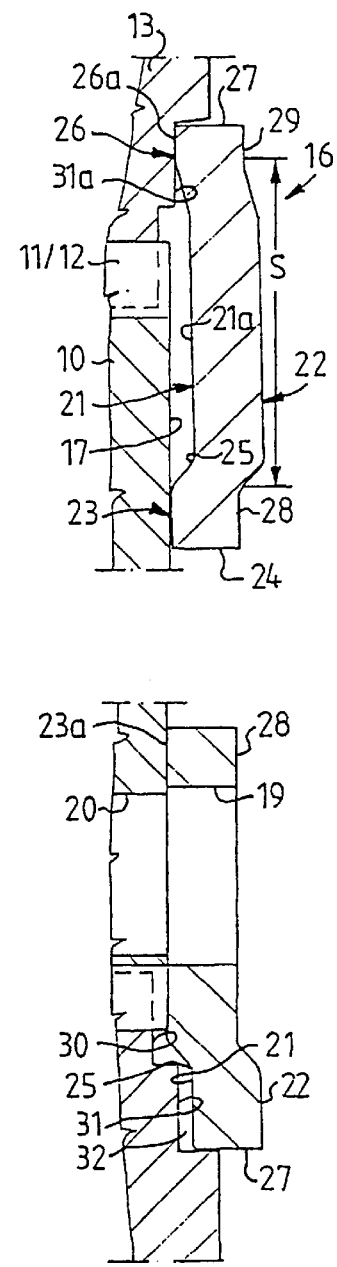
FIG.1
FIG.3

WHEEL HUB AND BRAKE DISC ARRANGEMENT FOR A VEHICLE WHEEL

BACKGROUND OF THE INVENTION

The present invention relates to a wheel hub and brake disc arrangement for a vehicle wheel, comprising a hub mounted via bearing means on a stub axle, a brake disc non-rotatably mounted on a carrier portion of the hub, and a lock ring axially fixed at an end of the carrier portion, said lock ring having a first side surface lying in contact with a surface on the brake disc and a second side surface, located radially inwardly of the first side surface, said second side surface being in contact with a surface on the hub, and said lock ring permitting, during resilient movement upon axial loading of the brake disc, limited axial displacement of the brake disc relative to the carrier portion.

The invention relates also to a resilient lock ring which is particularly, but not exclusively, intended for a wheel hub and brake disc arrangement for a vehicle wheel.

SE-A-501 006, for example, reveals as previously known a wheel hub and brake disc arrangement, in which the carrier portion of the hub is provided with exterior splines engaging interior splines in a central opening in the brake disc. The brake disc is fixed axially by means of outer and inner lock rings held in grooves in the carrier portion of the hub, of which the inner lock ring axially fixes a resilient ring which has flat parallel opposing side surfaces, one of which having a radially outer portion in contact with a surface on the brake disc and a radially inner portion in contact with a surface of the hub. The resilient ring permits limited axial movement between the disc and the hub to compensate for tolerances and for deformation which occurs in the components involved in braking. The arrangement does not, however, allow for axial pretensioning of the disc, and the result is that. under unfavorable conditions, vibrations can occur during braking.

It is also known to screw a resilient lock ring securely to the wheel hub so that a portion of the side of the ring facing the hub and the brake disc is in contact with the hub and the rest against the disc. The spring distance of the lock ring, i.e. the radial extent of the area between the edge of the surface portion fixed against the hub and the outer edge of the ring, will in this case be relatively short, in a known example circa 3–5 mm. The short spring distance only permits a short axial spring movement which in turn increases the risk of crack formation in comparison to what is the case when there is a long spring distance. Due to the fact that the spring distance is short, the permissible degree of pretensioning is also relatively low.

SUMMARY OF THE INVENTION

The purpose of the present invention is to achieve a wheel hub and brake disc arrangement of the type described by way of introduction which dampens vibrations and reduces the risk of crack formation in a more effective manner than previously.

This is achieved according to the invention by virtue of the fact that the lock ring in the areas between said first and second side surfaces has surfaces which lack contact both with said surface on the brake disc and said surface on the hub.

The design according to the invention reduces the radial extent of the contact surfaces of the ring against the disc and the hub at the same time as the radial distance between the surfaces increases. The intermediate surface which lacks contact with the disc and the hub forms a surface on a resilient "bridge" between the contact surfaces. In this manner the spring distance can be increased approximately four times the spring distance of the known design described above. This in turn decreases the risk of crack formation and the lock ring can be pretensioned significantly more than what was previously possible, which reduces the vibrations.

A preferred embodiment of a resilient lock ring with opposing, at least substantially plane, radial side surfaces, which is particularly suited for use in the wheel hub and brake disc arrangement according to the invention, but which can also be used in other contexts, where one can make use of the above described properties, is characterized in that one side surface of the ring at its radially inward portion has an annular ridge and at its radially outward portion circumferentially spaced bosses and that holes for mounting screws extend through the ridge in areas without opposing bosses.

BRIEF DESCRIPTION OF THE DRAWINGS

The invention will be described in more detail below with reference to examples shown in the accompanying drawings, where FIG. 1 shows a longitudinal section through one embodiment of a wheel hub and brake arrangement according to the invention, FIG. 3 shows a section through the ring in FIG. 2 along the line III—III on an enlarged scale with adjacent portions of the brake disc and the hub shown.

DETAILED DESCRIPTION OF THE DRAWINGS

Figure 2:
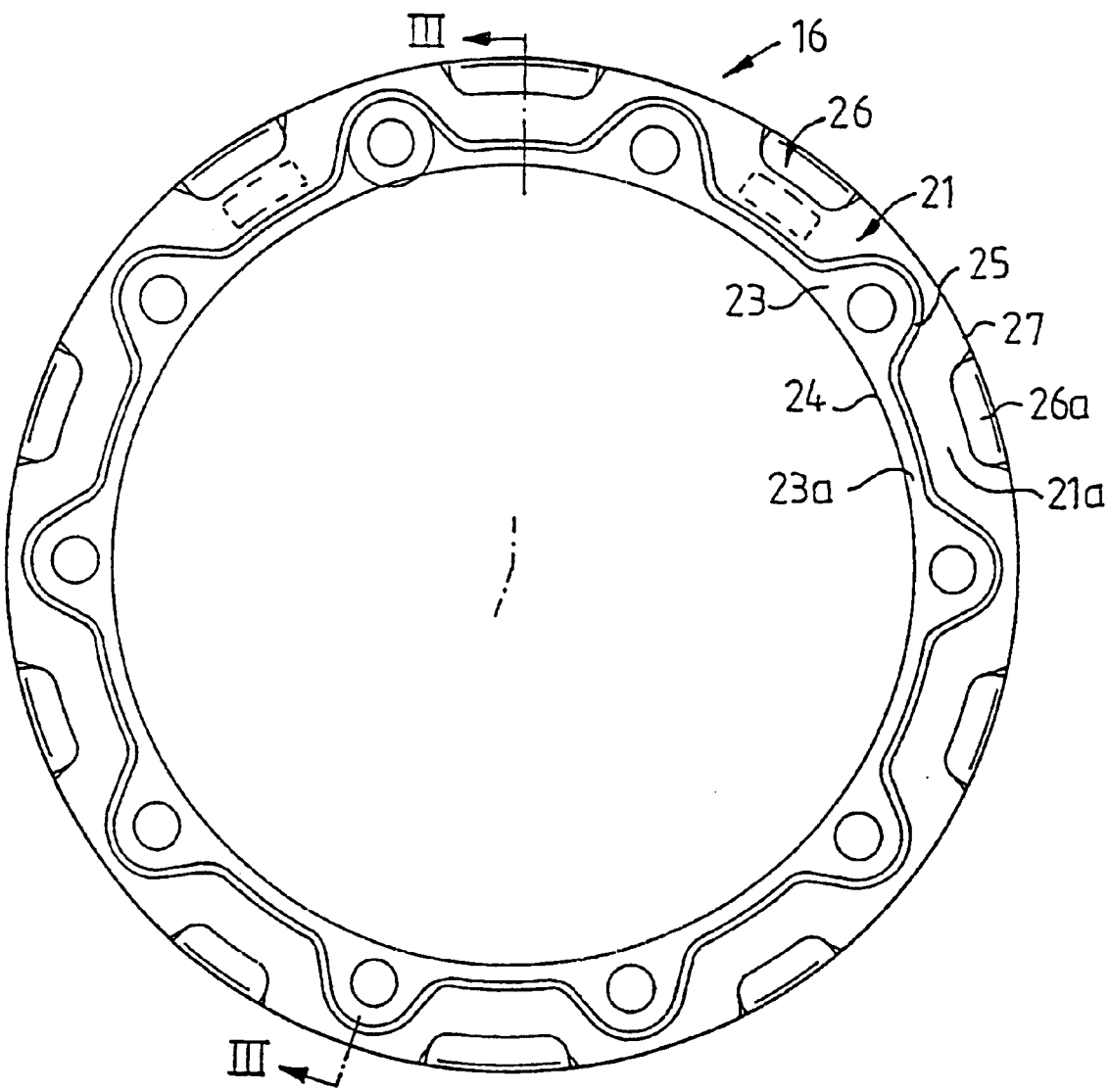
FIG. 2 shows a plan view of a resilient lock ring.

In FIG. 1, the numeral 1 generally designates a wheel hub of a heavy truck. The hub 1 is rotatably mounted on a stub axle 2 via two conical roller bearings 3,4 and is made in one piece with a disc-shaped carrier element 5, a so-called wheel disc, to which two wheel rims 6,7 are securely screwed by means of a number of evenly spaced screws 8 with nuts 9. Inside the wheel disc 5 the hub 1 has a neck portion 10, the outer lateral surface of which being provided with V-shaped splines 11,12. A brake disc 13 has a central opening with corresponding splines engaging the splines in the neck portion 10 to rotationally fix the brake disc 13. The disc 13 is fixed axially by a groove-mounted distal lock ring 15 with a circular cross section and a proximal lock ring 16 which is resilient and is preferably made of drill steel. The lock ring 16 is screwed securely to a radial wall surface 17 on the hub 1 by means of peripherally evenly spaced screws 18, which extend through holes 19 (FIG. 3) in the ring 16 and into threaded bores 20 in the hub 1.

The lock ring 16 has a rectangular basic profile with alternating rises and depressions in its opposite side surfaces 21 and 22. On its side 21 facing the wall surface 17 of the hub 1, the lock ring 16 is provided with a ridge 23 which extends from the inner circumferential edge 24 of the ring and radially outwards to a wave-shaped outer edge 25. In this manner a ridge 23 is formed with alternating narrow and broad sections, where the holes 19 for the mounting screws 18 extend through the broader sections. Evenly spaced between the broad sections of the ridge 23 are bosses or raised portions 26, which extend from the distal edge 27 of the ring 16 and radially inwards somewhat past the the broadest section of the ridge.

The ring 16 is manufactured by stamping and pressing, and the raised portions formed by the ridge 23 and the bosses 26 on the side 21 of the ring facing the hub 1 thus correspond to the depressions 28 and 29 on the reverse side 22.

FIG. 3 shows on an enlarged scale the ring 16 and the adjacent portions of the hub 1 and the brake disc 13 when the ring is screwed securely to the hub. As can be seen in FIG. 3, the brake disc 13 in the area closest to the splines 11,12 is made with steps 30 and 31, the surface 26a of the bosses lying in contact with the surface 31a of the step 31, while the surface 23a of the ridge 23 is in contact with the wall surface 17 of the hub 1. As can be seen in the upper half of FIG. 3, an intermediate surface portion 21a will lie spaced from both the brake disc 13 and the hub 1, which means that a spring distance corresponding to the distance "S" can be achieved when the disc 13 is loaded to the right. It is evident from the lower half of FIG. 3 that the heights of the ridge 23 and the steps 30 and 31 are adapted to each other so that in the axially unloaded state of the disc 13 there will be a gap 32 between the surface 21 of the lock ring and the brake disc 13. The height of the bosses 26 is so adapted to the step 31 that the lock ring 16 is pretensioned when it is screwed securely to the hub surface 17.

In addition to the advantage of improved vibration damping by permitting high pretensioning, the arrangement described reduces the risk of cracking by virtue of the relatively long spring distance "S". Furthermore, the heat transfer from the brake disc 13 to the hub 1 via the lock ring 16 is also reduced by virtue of the fact that only a small portion of the total surface of the ring is contact surface against the brake disc and the hub.

The wheel hub and brake disc arrangement according to the invention has been described above with reference to a hub with double rims and with a splines connection between the brake disc and the hub. The invention as defined by the patent claims also encompasses, of course, other connecting means between the brake disc and the hub which provide a certain axial relative movement between the disc and the hub, as well as hubs with single rims. The lock ring described can also be used in other similar installations to solve the problems with vibration and cracking which would otherwise arise when using a completely flat resilient lock ring. The ring can consist of several parts, e.g. two ring halves which form a solid ring when screwed securely to the hub. In order to eliminate the risk of the wrong side being mounted facing the disc and the hub, the side which is to be facing away from the hub and the disc can be provided with a boss placed so that it cannot be laid flat if the ring is mistakenly mounted with this side facing the hub and the disc.

We claim:

1. A wheel hub and brake disc arrangement for a vehicle wheel, comprising a hub (1) mounted via bearing means (3, 4) on a stub axle (2), a brake disc (13) non-rotatably mounted on a carrier portion (10) of the hub, and a lock ring (16) axially fixed at an end of the carrier portion, said lock ring having a first side surface (26a) lying in contact with a side surface (31a) on the brake disc and a second side surface (23a), located radially inwardly of an on the same side as the first side surface, said second side surface being in contact with a side surface (17) on the hub, and said lock ring (16) permitting, during resilient movement upon axial loading of the brake disc, limited axial displacement of the brake disc relative to the carrier portion, characterized in that the lock ring (16) in the areas between said first and second side surfaces (26a, 23a) has surfaces (21a) which lack contact both with said surfaces (31a) on the brake disc and said surface (17) on the hub.

2. The arrangement according to claim 1, characterized in that the lock ring (16) has circumferentially spaced axial holes (19) and said surface (17) on the hub has corresponding bores (20) and that the lock ring is screwed securely to the hub by means of screws (18) received in said holes and bores and lacks a side surface in contact with a surface of the brake in areas (32) radially outside the screws.

3. The arrangement according to claim 2, characterized in that a radially outer limiting line (25) of the ridge (23) is undulated so that a ridge with varying width is formed, and that the holes (19) for the mounting screws extend through the broader portions of the ridge.

4. The arrangement according to claim 3, characterized in that the ridge (23) and the bosses (26) on one side (21) of the lock ring (16) are made by pressing and correspond to depressions (25, 28) on the reverse side (22) of the lock ring.

5. The arrangement according to claim 1, characterized in that the second surface (23a) of the lock ring (16) is a surface on an annular ridge (23), that the first surface (26a) of the lock ring is formed of surfaces on circumferentially spaced bosses (26) and that the surface (21a) between the ridge and the bosses lacks contact with the brake disc (13) and the hub (1).

6. The arrangement according to claim 5, characterized in that the ridge (23) and the bosses (26) on one side (21) of the lock ring (16) are made by pressing and correspond to depressions (29, 28) on the reverse side (22) of the lock ring.

7. The arrangement according to claim 1, characterized in that the lock ring (16) is pretensioned against the brake disc and the hub.

8. A resilient lock ring with opposite at least substantially flat radial side surfaces, characterized in that one side surface (21) of the ring (16) at a radially inward portion thereof has an annular ridge (23) and at a radially outward portion thereof circumferentially spaced bosses (26), and that holes (19) for mounting screws extend through the ridge.

9. The lock ring according to claim 8, characterized in that a radially outer limiting line (25) of the ridge (23) is undulated, so that a ridge with varying width is formed and that the holes (19) extend through the broader portions of the ridge in areas which lack opposing bosses (26).

* * * * *